United States Patent Office 3,257,436
Patented June 21, 1966

3,257,436
PREPARATION OF AMIDES OF HYDROXY
NON-TERTIARY AMINES
Paul Lindner, Evanston, Ill., assignor to Witco Chemical Company, Inc., New York, N.Y., a corporation of Delaware
No Drawing. Filed Nov. 6, 1962, Ser. No. 235,826
12 Claims. (Cl. 260—404)

My invention relates to a new and highly advantageous method for the preparation of higher molecular weight monocarboxylic acid amides of hydroxy primary and secondary amines, particularly higher molecular weight fatty acid amides of hydroxy-alkyl primary and secondary amines.

Higher molecular weight monocarboxylic acid amides of hydroxy primary and secondary amines, exemplified, especially, by $C_8$ to $C_{20}$ fatty acid amides of monoethanolamine, diethanolamine and mono-isopropanolamine, are in wide commercial usage in the detergent and related fields. These amides are conventionally formed by condensing a higher molecular weight monocarboxylic acid, or an ester thereof, for instance, lauric acid or myristic acid or coconut oil fatty acids, or coconut oil, with monoethanolamine or diethanolamine or other hydroxy primary or secondary amines, at elevated temperatures, very commonly, in certain of such condensation reactions, at temperatures of the order of 150 to 170 degrees C. for a period of several hours. In such condensation reactions, while it is commonly desired that the end condensation product contain predominantly amides of the higher molecular weight monocarboxylic acid with the selected hydroxy primary and secondary amines, the said condensation products invariably contain substantial proportions of other materials as, for instance, esters, ester-amides, soaps, and unreacted hydroxy amine. The amide contents of such condensation products vary but, very commonly, are of the approximate order of 60 to 67%. The hydroxy primary and secondary amines are commonly reacted, depending upon properties desired, with the higher molecular weight monocarboxylic or fatty acids in mol ratios of about 1 to 2 of said amines to 1 of said acids.

Various methods have been utilized, in accordance with prior art teachings, to attempt to bring about the formation of condensation products in which the amide contents are appreciably higher than what is conventionally produced by following the procedures described above. One of such approaches has been to allow the condensation product, after completion of the condensation reaction proper, to age, within specified temperature ranges, for prolonged periods of time, commonly of the order of 16 hours to several days. Another procedure which has come into appreciable use in accordance with teachings in the art involves carrying out the condensation reaction, for example, between approximately equal mol weights of diethanolamine and the higher fatty acid material by utilizing the latter in a form of a methyl ester, for instance, methyl laurate or methyl myristate or methyl esters of coconut oil fatty acids, and carrying out the condensation reaction in the presence of a catalyst such as an alkali metal alkoxide or alcoholate, for instance, sodium methylate, the reaction being carried out under substantially anhydrous conditions. Such condensation products, because of their high contents of amides, for instance of the order of 90% of diethanolamides, are commonly referred to as superamides or high-activity amides.

Another procedure which has been proposed involves reacting higher fatty acid triglycerides, such as coconut oil, with a lower monohydric alcohol, such as methanol, in the presence of an alkali metal alkoxide, with hydroxy primary or secondary amines such as monoethanolamine or diethanolamine; and still another suggested procedure involves heating a mixture of a primary or secondary alkanolamine, such as monoethanolamine or diethanolamine, with a sodium methoxide catalyst to a temperature of about 55 to 75 degrees C., and gradually adding to said mixture a cold fatty acid ester, such as methyl laurate or coconut oil, while maintaining the reaction mixture in a vacuum, for instance, of the order of 29 inches of mercury, the methyl alcohol being distilled off continuously as the amidification reaction proceeds.

The foregoing, and other methods as well, suffer a number of significant disadvantages. These may, in general, be described as requiring relatively long reaction periods; or after-treatments, generally over prolonged periods of time, in order to bring about the production in the final condensation products of relatively high contents of amides; or the maintenance of relatively high vacuum conditions during the reaction; or, in certain cases, the utilization of relatively high temperatures in order to complete the reaction to a sufficient extent to result in the production of condensation products having relatively high amide contents. Possibly the best presently known procedure for the production of high amide content condensation products of the type here involved is that wherein an hydroxy primary or secondary amine, such as diethanolamine, is reacted with a methyl ester of a higher molecular weight fatty acid in the presence of a sodium methylate catalyst. Here, however, the reaction periods are still relatively substantial, particularly if low temperatures are utilized in the reaction process, although amide contents of the order of 90% are readily obtainable.

I have discovered, in accordance with my present invention, that exceptionally high contents of amides can be obtained by a method in which an hydroxy primary or secondary amine is condensed with an ester of a higher molecular weight monocarboxylic acid, particularly a higher molecular weight fatty acid, the condensation reaction being carried out in the presence of an alkali metal alkoxide or other catalyst and in the presence of an appreciable amount of an amide of an hydroxy amine formed in situ in the reaction mixture at the beginning stages of the reaction, said in situ amide being in an amount generally of the order of at least 10% and better still from 20 to 30%, by weight of the hydroxy primary or secondary amine utilized in the carrying out of the condensation reaction, the amidification reaction being carried out in the main at essentially atmospheric pressure and while maintaining the alcohol formed during the reaction, or added to the reaction mixture at the outset, in the reaction mixture until at least very predominate formation of the desired amide of the hydroxy primary or secondary amine has been completed.

The amide of the hydroxy primary or secondary amine which is formed in situ, in the beginning stages of the reaction, may be the same as the amide of the hydroxy primary or secondary amine which is sought to be produced in accordance with the condensation reaction or it may be of different character. Thus, for instance, if the method is intended to produce the amide of diethanolamine and lauric acid (lauric acid diethanolamide), the in situ formed amide may be said amide, or it may be an entirely different amide as, for instance, the oleic acid amide of monoisopropanolamine. In such cases where the in situ formed amide is different from the amide intended to be produced by the method of the invention, the final condensation or reaction product will, of course, contain a mixture of both amides.

One illustrative way of practicing the method of the present invention comprises dissolving some hydroxy primary or secondary amine, for instance, diethanolamine, in a solution of the alkali metal alkoxide or other catalyst in methyl alcohol or the like, then adding, under vigorous agitation, an amount of the ester of the higher molecular weight monocarboxylic acid, for instance, methyl laurate, sufficient to form, in situ, several percent of the diethanolamide of lauric acid and, after the resulting solution becomes clear (indicating the formation in situ of the diethanolamide of lauric acid), adding the balance of the hydroxy primary or secondary amine, for instance diethanolamine, and then gradually or incrementally adding the methyl laurate while maintaining the temperature in the range of room temperature to 50 degrees C. The aforesaid reaction is carried out at atmospheric pressure and the methyl alcohol originally present as well as that which is formed during the amidification reaction is allowed to remain at least until said amidification reaction has been mainly completed. An alternative procedure, also falling within the principles and teachings of my invention, comprises including in the initial reaction mixture with the alkali metal alkoxide catalyst or solution thereof all of the hydroxy primary or secondary amine to be used in the reaction and then, after the formation of the in situ amide, gradually or incrementally adding the methyl laurate and carrying out the reaction in the manner described above.

Condensation products having high contents of amides, for instance, 80% or 85%, as well as in excess of 90%, are readily producible, the remainder of the condensation product usually comprising small proportions of unreacted hydroxy amine, ester-amine, soap and unreacted ester.

The essential reactants used, in carrying out the novel method of my invention, comprise an hydroxy primary or secondary amine, an ester of a higher molecular weight monocarboylic acid, particularly a methyl ester thereof, and a catalyst, especially sodium methylate. In certain cases, for enhancement of the solubility of the mixture of the hydroxy primary or secondary amine and the catalyst and the amide formed during the reaction, it is desirable to incorporate in the reaction mixture a lower molecular weight alcohol containing from 1 to 5 carbon atoms, such as methanol, ethanol, propanol, isopropanol, butanol, isobutanol or pentanols, especially methanol, but such added alcohol is not ordinarily an essential ingredient of the reaction mixture if said mixture is sufficiently liquid at the reaction temperature utilized.

In the practice of my invention, the addition of the ester of the higher molecular weight monocarboxylic acid, for instance, methyl laurate, to the system or solution of the hydroxy primary or secondary amine and catalyst, with or without the free lower alcohol as may be necessary, is effected at such a rate as to maintain a single phase system, to wit, a clear or essentially clear solution, in which the hydroxy primary or secondary amine is always present in a substantial excess over the introduced ester of the higher molecular weight monocarboxylic acid. The result is that the more stable and desired amides of the hydroxy primary or secondary amines are produced at low temperatures as distinguished from the production of an ester-amide linkage with the said hydroxy amines. At the same time, the formation of the amide and the liberation of the alcohol from the ester of the higher molecular weight monocarboxylic acid, during the course of the reaction, results in an increase of the solvent base thereby permitting increased speed of the addition of the higher molecular weight monocarboxylic acid ester to the reaction mixture without adversely affecting the desired amidification reaction. My invention lends itself to a continuous method for the production of $C_8$–$C_{20}$ monocarboxylic acid amides of hydroxy primary and secondary amides.

The mol ratio of the higher molecular weight fatty acid (contained in the ester thereof used in the method of the present invention) to the hydroxy primary or secondary amine is variable but it generally is advantageous to operate within the range of 1:1 to 1:2 and particularly in the range of 1:1 to 1:1.3.

The temperature at which the condensation reaction is carried is in the range of room temperature, preferably 30 degrees C., to 50 degrees C. The reaction time necessary to form the amides, in accordance with the practice of the method of my invention, will vary somewhat but, in general, such reaction periods will range from about 1 to 3 hours. The higher molecular weight monocarboxylic acid ester, for instance, methyl laurate, is added, over a short period of time, to the mixture of the other ingredients, generally speaking, gradually or in increments, and, as the reaction proceeds, the speed of the gradual or incremental additions can be accelerated the conditions being such that the reaction mixture remains clear and constitutes a single phase, a substantial excess of the hydoxy primary or secondary amine being maintained to essentially the end of the reaction period.

As stated above, the method of the invention is carried out at atmospheric pressure or essentially at atmospheric pressure and at low temperatures to maintain the methanol or other lower molecular weight alcohol which is added or which may be formed during the reaction present in the reaction mixture until at least the major phase of the amidification reaction has been completed. By so proceeding, the methanol or other lower molecular weight alcohol plays a definite role in inhibiting any tendency of ester formation to occur between the hydroxy primary or secondary amine and the higher molecular weight monocarboxylic acid ester.

In carrying out the method of my invention, while the essential condensation reaction in which by far the major phase of the amidification has been completed is conducted at a temperature of the order of room temperature to 50 degrees C., it is sometimes advantageous to finish the reaction to the extent desired at a somewhat higher temperature for a short period of time. Since the amidification reaction has been mainly finished, the small excess of free hydroxy primary or secondary amine becomes a large excess in relation to the remaining unreacted higher molecular weight monocarboxylic acid ester, thus minimizing the possibility of ester-amide formation.

The hydroxy primary and secondary amines which, for convenience, are denoted as hydroxy non-tertiary amines, utilized in the practice of my invention may be selected from a large number. They contain one or more amine groups having at least one replaceable hydrogen atom and may, for convenience, be called hydroxy non-tertiary amines. Illustrative examples thereof are monoethanolamine, diethanolamine, monopropanolamine, monoisopropanolamine, monobutanolamine, dibutanolamine, monoisobutanolamine, glycerol monoamine, glycerol diamine, digylcerol monoamine, monoethyl ethanolamine, monoisopropylethanolamine, monopentanolamine, dipentanolamine, monohexanolamines, dihexanolamines, monooctanolamines, monolauryolamine, cyclohexyl ethanolamine, 1-hydroxy-ethylamino-2-methoxy-propan-ol-3, hydroxyethyl ethylene diamine, hydroxyethyl propylene tetraamine; 1-amino-2,3-propanediol; 1-amino-2,3-propanol; and mixtures of any two or more thereof. Of especial utility are hydroxy-alkyl non-tertiary amines having from 2 to 4 carbon atoms in each alkyl radical as, for example, monoethanolamine, diethanolamine and monoisopropanolamine.

The esters of the higher molecular weight ($C_8$–$C_{20}$) monocarboxylic acids utilized in the method of the present application may be selected from extensive groups of known examples thereof. Of especial utility are the methyl esters of $C_8$–$C_{18}$ fatty acids such as methyl caprylate, methyl caprate, methyl laurate, methyl myristate, methyl palmitate, methyl oleate, methyl stearate, methyl linoleate, and methyl esters of mixed fatty acids derived from triglyceride oils and fats or by synthetic processes as, for instance, through the oxidation of hydrocarbons, particularly methyl esters of $C_{12}$–$C_{14}$ fatty acids or mixtures containing predominately $C_{12}-C_{14}$ fatty acids. Triglyceride oils and fats such as coconut oil, palm kernel oil, babassu oil, cottonseed oil, soya bean oil, corn oil, peanut oil, lard, and tallow represent other commercial sources of esters which can be used in the practice of the method of my invention. Other esters of $C_8-C_{20}$ monocarboxylic acids can be used such as the ethyl, propyl and isopropyl alcohol esters but for commercial and other reasons their use is not preferred.

The catalysts employed in accordance with the present invention are most advantageously the alkali metal alkoxides which are preferably added as such to the reaction mixture but which may be formed in situ in accordance with known techniques. Such catalysts have been used, as indicated previously, in various amidation reactions and no novelty is per se broadly claimed as to such use. The alkali metal alkoxides used pursuant to the present invention are those containing from 1 to 5 carbon atoms and include the sodium, potassium and lithium alkoxides derived from monohydric alcohols such as methanol, ethanol, propanol, isopropanol, butanol, isobutanol, and pentanols. Especially satisfactory, as stated above, is sodium methylate.

In place of or in conjunction with the alkali metal alkoxides, other catalysts which can be utilized are the alkali metal amides, such as sodium amide, potassium amide and lithium amide; and the alkali metal aminoalkoxides containing from 1 to 5 carbon atoms, the latter being derived, by way of example, by the interaction of an alkali metal such as sodium, potassium or lithium with an hydroxy amine such as monoethanolamine, diethanolamine, monoisopropanolamine or other hydroxy amines, or by dehydration of an alkali metal hydroxide solution in the hydroxy amine.

While the amount of the catalyst employed is somewhat variable, for best results it should be in the range of from 1 to 5 grams, and should ordinarily not exceed about 5 grams, and more advantageously should like in the range of 2.5 to 3.5 grams, in the case of sodium or other alkali metal methylate or methoxide, per gram mol of the ester of the long chain monocarboxylic acid, particularly the methyl esters of the $C_8-C_{20}$ fatty acids, utilized in the reaction. The use of excessive amounts of the catalyst tends to cause instability especially of secondary amide linkages.

In order that the full details of my invention will be even better appreciated, the following examples are provided. These examples are illustrative of the practice of the method of my invention and it will be understood that variations may be made therein in a number of particulars without in any way departing from the fundamental principles and teachings provided herein. The examples, therefore, are not to be construed in any way as limitative of the scope of my invention.

*Example 1*

To 29 grams of a 10.9% sodium methylate solution in methanol, 110.25 grams of diethanolamine (1.05 mols) are added, the mixture is heated to 45 degrees C. and, starting very slowly (10 ml. in 20 minutes), with vigorous agitation, and then increasing the rate of addition, at atmospheric pressure conditions, a total of 286 grams (1 mol) of the methyl ester of a mixture of stearic and palmitic acids is added over a period of 2 hours, while maintaining substantial clarity in the reaction mixture. The reaction mixture is then maintained for one additional hour at 43 degrees C. at atmospheric pressure conditions at which time about 80% of the amidification reaction has been completed. Then distillation of the methanol at 60 degrees C. under vacuo is carried out whereupon the amidification reaction goes to about 91% of completion, the free diethanolamine content being about 4%.

*Example 2*

To 20 grams of a 24% active sodium methylate solution in methanol, 220 grams of diethanolamine are added, the mixture is heated to about 38 degrees C. and, starting very slowly (40 ml. in 20 minutes), with vigorous agitation, and then increasing the rate of addition, at atmospheric pressure conditions, a total of 445 grams of the methyl ester of a commercial mixture (70/30) of lauric and myristic acids is added over a period of about 1½ hours while maintaining substantial clarity in the reaction mixture. The resulting reaction mixture is then maintained for one additional hour at approximately 43 degrees C. A small vacuum is then drawn on the flask and distillation is started at about 45 degrees C. and the temperature is slowly increased to about 60 degrees C. while simultaneously increasing the vacuum. On analysis, the final condensation reaction product contains about 92% diethanolamide of the mixture of lauric and myristic acids, the balance constituting essentially free diethanolamine, ester-amine of diethanolamine with said mixture of lauric and myristic acids, and soap.

*Example 3*

To 20 grams of a 24% sodium methylate solution in methanol, 70 grams of diethanolamine are added, the mixture is heated to 30 degrees C. and, starting slowly (10 ml. in 18 minutes), with vigorous agitation, and then increasing the rate of addition, at atmospheric pressure conditions, a total of 205 grams of methyl oleate (80% active) is added over a period of 2¾ hours, while maintaining substantial clarity in the reaction mixture. The methanol is then distilled out of the reaction mixture in vacuo at about 50 degrees C.

*Example 4*

To 5 grams of a 24% sodium methylate solution in methanol, 57.8 grams of diethanolamine and 10 ml. of methanol are added, the mixture is heated to 40 degrees C. and, starting slowly (10 ml. in 20 minutes), with vigorous agitation, and then increasing the rate of addition, at atmospheric pressure conditions, a total of 110 grams of coconut oil is added over a period of 2 hours, while maintaining substantial clarity in the reaction mixture. The methanol is then distilled out of the reaction mixture in vacuo at about 55 degrees C.

*Example 5*

The method described in Example 2 is carried out except that (1) 50 grams of methanol are added to the reaction mixture prior to the addition of the methyl ester of the lauric and myristic acids, and (2) in place of the 220 grams of diethanolamine, there are utilized 128 grams of monoethanolamine.

*Example 6*

The method described in Example 2 is carried out except that (1) 30 grams of methanol are added to the reaction mixture prior to the addition of the methyl ester of the lauric and myristic acids, and (2) in place of the 220 grams of diethanolamine, there are utilized 158 grams of monoisopropanolamine.

*Example 7*

To 20 grams of a 24% active sodium methylate solution in methanol, 80 grams of diethanolamine and 10 grams of methanol are added, the mixture is heated to about 40 degrees C. and then there are added thereto gradually over a period of 25 minutes 50 grams of methyl laurate, under conditions of vigorous stirring, the reaction mixture being maintained at a temperature of about 40 degrees C. at atmospheric pressure. Then, 140 grams of diethanolamine are added to the reaction mixture, followed by the gradual addition, over a period of 2 hours, of 395 grams of methyl laurate while maintaining the reaction mixture at a temperature of about 40 degrees C.

at atmospheric pressure. The mixture is then held at about 45 degrees C. for about ¾ hour after which the methyl alcohol is distilled off under vacuo at 55–60 degrees C.

What I claim as new and desire to protect by Letters Patent of the United States is:

1. A method of preparing $C_8$–$C_{20}$ monocarboxylic acid amides of hydroxy non-tertiary amines which comprises providing a solution containing a catalyst selected from the group consisting of alkali metal alkoxides containing from 1 to 5 carbon atoms, alkali metal amides and alkali metal aminoalkoxides containing from 1 to 5 carbon atoms, and an hydroxy non-tertiary amine, adding gradually thereto an ester of a $C_8$–$C_{20}$ monocarboxylic acid until at least several percent of a $C_8$–$C_{20}$ monocarboxylic acid amide of said hydroxy non-tertiary amine is formed in situ, and then continuing the gradual addition of an ester of a $C_8$–$C_{20}$ monocarboxylic acid to said solution at essentially atmospheric pressure and at a temperature within the range of about room temperature to 50 degrees C. while maintaining the reaction mixture substantially clear until said hydroxy non-tertiary amine is converted substantially to amides of the $C_8$–$C_{20}$ monocarboxylic acid.

2. A method in accordance with claim 1, in which the $C_8$–$C_{20}$ monocarboxylic acid is predominately a $C_{12}$–$C_{14}$ fatty acid.

3. A method in accordance with claim 1, in which the hydroxy non-tertiary amine is diethanolamine.

4. A method in accordance with claim 1, in which the ester of $C_8$–$C_{20}$ monocarboxylic acid is a methyl ester of a $C_{12}$–$C_{14}$ fatty acid, the hydroxy non-tertiary amine is diethanolamine, and the catalyst is sodium methylate.

5. A method in accordance with claim 1, wherein the amount of the in situ formed $C_8$–$C_{20}$ monocarboxylic acid amide of the hydroxy non-tertiary amine constitutes from about 10% to 30% by weight of the hydroxy non-tertiary amine.

6. A method of preparing $C_8$–$C_{20}$ fatty acid amides of hydroxy-alkyl non-tertiary amines in which the alkyl radical contains from 2 to 4 carbon atoms, which comprises providing a solution containing a catalyst selected from the group consisting of alkali metal alkoxides containing from 1 to 5 carbon atoms, alkali metal amides and alkali metal aminoalkoxides containing from 1 to 5 carbon atoms; an hydroxy-alkyl non-tertiary amine in which the alkyl radical contains from 2 to 4 carbon atoms, adding gradually thereto a methyl ester of a $C_8$–$C_{20}$ fatty acid while maintaining the hydroxy-alkyl non-tertiary amine in stoichiometric excess over that of the $C_8$–$C_{20}$ fatty acid in the solution and while maintaining said solution at a temperature in the range of about 30 to 50 degrees C. until at least several percent of a $C_8$–$C_{20}$ fatty acid amide of said hydroxy-alkyl non-tertiary amine is formed in situ, and then continuing the gradual addition of a methyl ester of a $C_8$–$C_{20}$ fatty acid to said solution at essentially atmospheric pressure and at a temperature in the range of about 30 to 50 degrees C. while maintaining the reaction mixtures substantially clear and the hydroxy-alkyl non-tertiary amine in stoichiometric excess over that of the $C_8$–$C_{20}$ fatty acid in the reaction mixture, until said hydroxy-alkyl non-tertiary amine is converted substantially to the amides of the $C_8$–$C_{20}$ fatty acids.

7. A method in accordance with claim 6, wherein the mol ratio of the $C_8$–$C_{20}$ fatty acids present in said methyl ester to the hydroxy-alkyl non-tertiary amine is from 1:1 to 1:1.3, and wherein the catalyst is sodium methylate and the amount thereof constitutes from 1 to 5 grams per gram mol of the methyl ester of the $C_8$–$C_{20}$ fatty acids.

8. A method in accordance with claim 6, in which the hydroxy-alkyl non-tertiary amine is monoethanolamine, and in which the initial solution also contains methanol.

9. A method in accordance with claim 6, wherein the mol ratio of the $C_8$–$C_{20}$ fatty acids present in said methyl ester to the hydroxy-alkyl non-tertiary amine is from 1:1 to 1:1.3.

10. A method in accordance with claim 6, wherein part of the hydroxy-alkyl non-tertiary amine utilized in the reaction is incorporated in the initially provided solution, and the remainder of said hydroxy-alkyl non-tertiary amine is incorporated into the reaction mixture after the completion of the formation of the in situ $C_8$–$C_{20}$ fatty acid amide of the hydroxy-alkyl non-tertiary amine.

11. A method in accordance with claim 6, wherein all of the hydroxy-alkyl non-tertiary amine utilized in the reaction is incorporated in the initially provided solution.

12. A method in accordance with claim 6, in which the speed of the gradual addition of the methyl ester of the $C_8$–$C_{20}$ fatty acid is accelerated as the reaction proceeds.

References Cited by the Examiner

UNITED STATES PATENTS

| | | | |
|---|---|---|---|
| 2,464,094 | 3/1949 | Meade | 260—404 |
| 2,844,609 | 7/1958 | Tesoro | 260—404 |
| 2,877,246 | 3/1959 | Schurman | 260—404 |
| 3,107,258 | 10/1963 | Lamberti | 260—404 |

CHARLES B. PARKER, *Primary Examiner.*

JOSEPH P. BRUST, ROBERT V. HINES, ANTON H. SUTTO, *Assistant Examiners.*